US012722601B2

(12) United States Patent
Shi

(10) Patent No.: US 12,722,601 B2
(45) Date of Patent: Sep. 1, 2026

(54) SIDE BRUSH MECHANISM FOR A TUNNEL TYPE CAR WASHING MACHINE

(71) Applicant: Zhejiang Yigoli Intelligent Technology Co., Ltd., Hangzhou (CN)

(72) Inventor: Hengzhi Shi, Hangzhou (CN)

(73) Assignee: Zhejiang Yigoli Intelligent Technology Co., Ltd., Hangzhou (CN)

( * ) Notice: Subject to any disclaimer, the term of this patent is extended or adjusted under 35 U.S.C. 154(b) by 413 days.

(21) Appl. No.: 18/500,369

(22) Filed: Nov. 2, 2023

(65) Prior Publication Data

US 2024/0059258 A1 Feb. 22, 2024

(30) Foreign Application Priority Data

Feb. 14, 2023 (CN) ........................ 202320275298.1

(51) Int. Cl.
*B60S 3/06* (2006.01)
*B08B 1/12* (2024.01)
*B08B 1/32* (2024.01)

(52) U.S. Cl.
CPC ................ *B60S 3/063* (2013.01); *B08B 1/12* (2024.01); *B08B 1/32* (2024.01)

(58) Field of Classification Search
CPC ..... B08B 1/12; B08B 1/32; B60S 3/06; B60S 3/063
See application file for complete search history.

(56) References Cited

U.S. PATENT DOCUMENTS 4,453,284 A * 6/1984 Schleeter ................ B60S 3/063 15/DIG. 2
9,714,011 B2 * 7/2017 Belanger .................. A46B 5/00
2006/0112508 A1 6/2006 Kuivikko et al.
2007/0130712 A1 6/2007 Kuivikko et al.
2011/0107529 A1 5/2011 Hetler
2019/0176772 A1 * 6/2019 Belanger ................ A46B 13/02
2024/0057753 A1 * 2/2024 Shi ......................... A46B 13/02

FOREIGN PATENT DOCUMENTS

EP 0980802 A2 * 2/2000 .............. B60S 3/063
KR 100829416 B1 * 5/2008 .............. B60S 3/004

OTHER PUBLICATIONS

Machine Translation of KR 10-0829416 B1; Retrieved from KIPRIS on Feb. 7, 2026 (Year: 2026).*
Machine Translation of EP0980802A2; Retrieved from ESPACENET on Feb. 7, 2026 (Year: 2026).*

* cited by examiner

*Primary Examiner* — Sang K Kim
(74) *Attorney, Agent, or Firm* — Hemisphere Law, PLLC

(57) ABSTRACT

The present application relates to a side brush mechanism with a novel structure. The side brush mechanism includes a side brush mounting beam, mounted on a tunnel type car washing machine; a side brush assembly for brushing left and right sides of a vehicle; a side brush swing arm with one end rotatably connected to the side brush mounting beam and the other end rotatably connected to a reducer; the reducer in driving connection with the side brush assembly to drive the side brush assembly to rotate; a left-right skew actuator arranged between the side brush swing arm and the reducer and used for driving the reducer and the side brush assembly to swing vertically left and right to adjust a brushing angle.

8 Claims, 5 Drawing Sheets

SIDE BRUSH MECHANISM FOR A TUNNEL TYPE CAR WASHING MACHINE

BACKGROUND OF THE PRESENT DISCLOSURE

TECHNICAL FIELD

The present disclosure relates to the technical field of tunnel type car washing machines, and in particular, to a side brush mechanism with a novel structure.

DESCRIPTION OF RELATED ART

Existing automatic tunnel type car washing machines can clean vehicles, but their cleaning effects are not ideal. For example, a side brush structure of a tunnel type car washing machine, disclosed in the existing Chinese patent CN209553155U, can rotate and move laterally to clean a head and tail of a vehicle, and vertically and obliquely clean sides and windows of the vehicle, but is not suitable for supplementary cleaning due to its relatively complex structure and high manufacturing cost. Moreover, due to a one-time passing characteristic of the tunnel type car washing machine, residues are often left. For example, glass windows with large skew angles and corners of the head and tail of the vehicle require supplementary cleaning. If another pair of the same side brush assemblies is used, left-right lateral movement is not required, resulting in functional waste and cost increase.

Therefore, a side brush mechanism that can improve cleaning effects and reduce costs is urgently needed.

SUMMARY OF THE PRESENT DISCLOSURE

Application Content

An objective of the present disclosure is to provide a side brush mechanism with a novel structure in response to the above problems existing in the prior art.

In order to achieve the above objective, the present disclosure employs the following technical solution: A side brush mechanism with a novel structure includes:

- a side brush mounting beam, mounted on a car washing machine;
- a side brush assembly for brushing left and right sides of a vehicle;
- a side brush swing arm with one end rotatably connected to the side brush
- mounting beam and the other end rotatably connected to a reducer;
- the reducer in driving connection with the side brush assembly to drive the side brush assembly to rotate;
- a left-right skew actuator arranged between the side brush swing arm and the reducer and used for driving the reducer and the side brush assembly to swing vertically left and right to adjust a brushing angle; and
- a rocker arm actuator with one end rotatably connected to the side brush swing arm and the other end mounted on the car washing machine to drive the side brush swing arm to swing horizontally left and right.

Working principle and beneficial effects are as follows: 1. Compared with the prior art, the reducer and the side brush assembly are driven to swing vertically left and right by the left-right skew actuator in the present disclosure to adjust the brushing angle, so that the side brush assembly well fits a glass window with a large skew angle to provide a better cleaning effect; and 2. Compared with the prior art, the side brush swing arm is driven to swing horizontally by the rocker arm actuator in the present disclosure, so that the extended position of the side brush assembly can reach front and rear corners of the vehicle to further improve the cleaning effect.

Further, a limit block is arranged on the side brush mounting beam, and the limit block is used for limiting an opening of a rotation stroke of the side brush swing arm. This can limit a swing angle of the side brush swing arm and prevent the rocker arm actuator from being always at a full stroke, thereby prolonging the service life of the rocker arm actuator.

Further, a vertical seat bearing is arranged at an end, away from the side brush mounting beam, of the side brush swing arm, the vertical seat bearing is connected to a left-right skew bracket through a left-right skew swing shaft, and the left-right skew bracket is rotatably connected to the left-right skew actuator. The vertical seat bearing can be conveniently connected to the left-right skew bracket, so as to be indirectly connected to the left-right skew actuator.

Further, the other end of the left-right skew actuator is rotatably connected to a left-right skew support on the reducer. The left-right skew support can be conveniently connected to the left-right skew actuator and the reducer.

Further, a first proximity switch bracket is arranged on the left-right skew bracket, a first proximity switch is arranged on the first proximity switch bracket, and the first proximity switch corresponds to a side surface, away from the side brush mounting beam, of the side brush swing arm and is used for detecting a skew range of the side brush assembly. The skew range of the side brush assembly can be conveniently detected by the first proximity switch, which may be replaced by other similar sensors.

Further, a second proximity switch bracket is arranged above the side brush swing arm, a second proximity switch is arranged on the second proximity switch bracket, and the second proximity switch corresponds to a top or bottom surface of the side brush swing arm and is used for detecting a horizontal swing zero position of the side brush assembly. The second proximity switch can conveniently detect the horizontal swing zero position of the side brush assembly, that is, a swing zero position of the side brush swing arm.

Further, the side brush mounting beam is rotatably connected to the side brush swing arm through a side brush swing shaft, and an anti-falling plate is arranged at a bottom of the side brush swing shaft. The anti-falling plate can achieve a hard limiting effect and effectively prevent the side brush swing arm from falling.

Further, the side brush swing shaft is rotatably connected to the side brush swing arm through a rolling bearing, and a rocker arm end cover is arranged at a bottom of the side brush swing arm.

Further, a sealing ring and a sealing ring pressing plate are arranged on an outward end face of the rolling bearing, and a lock sheet and a lock nut are further arranged below the rolling bearing facing the ground.

Further, the reducer is connected to the left-right skew bracket through a reducer adapter flange.

Figure 1:
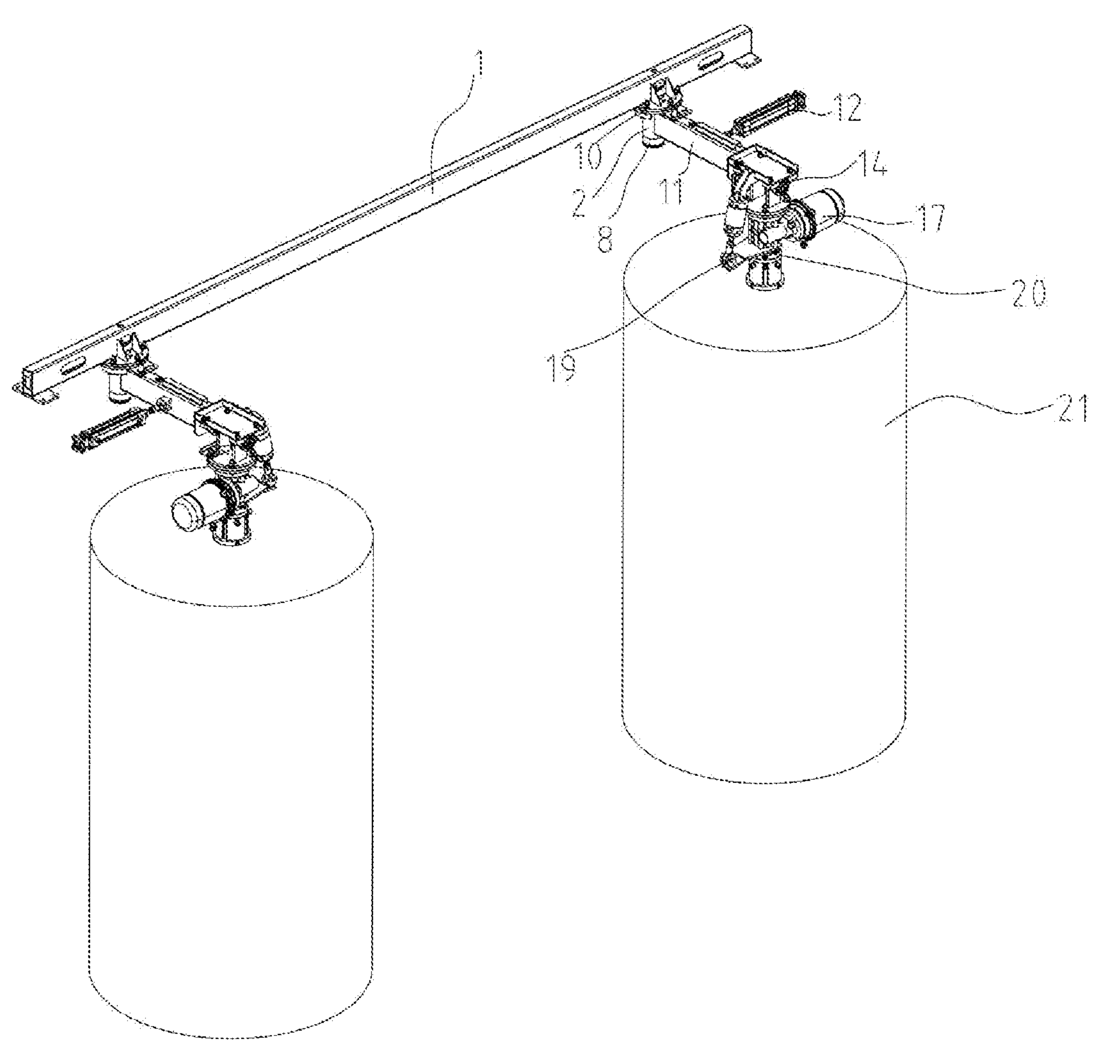
FIG. 1 is a schematic structural illustration of the present disclosure.
Figure 2:
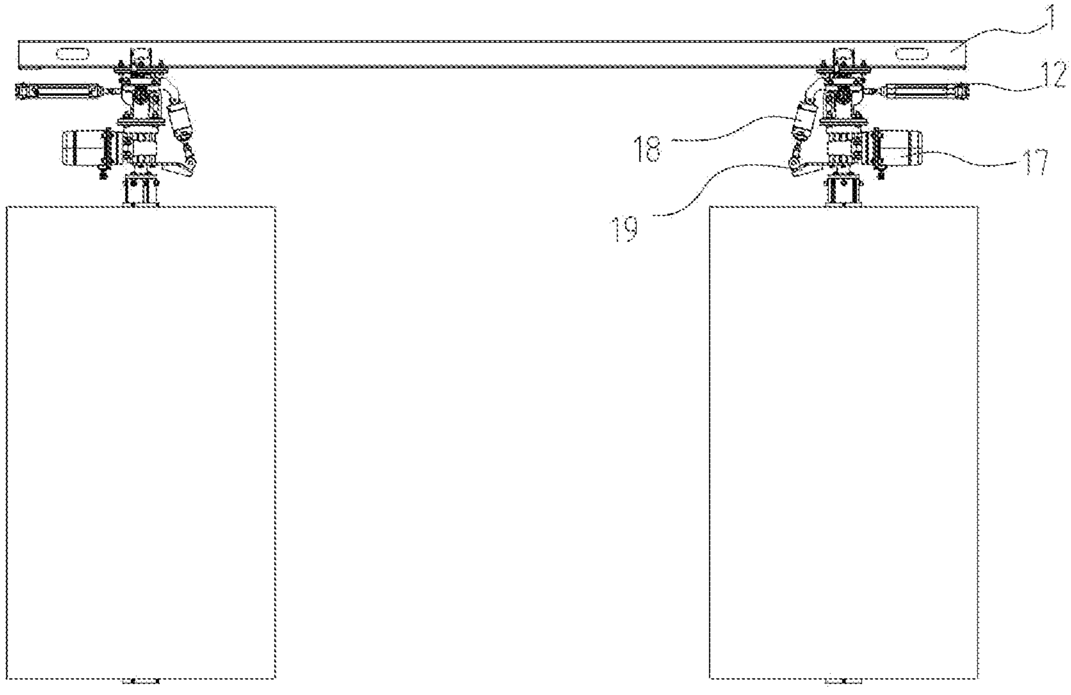
FIG. 2 is a front view of the present disclosure.
Figure 3:
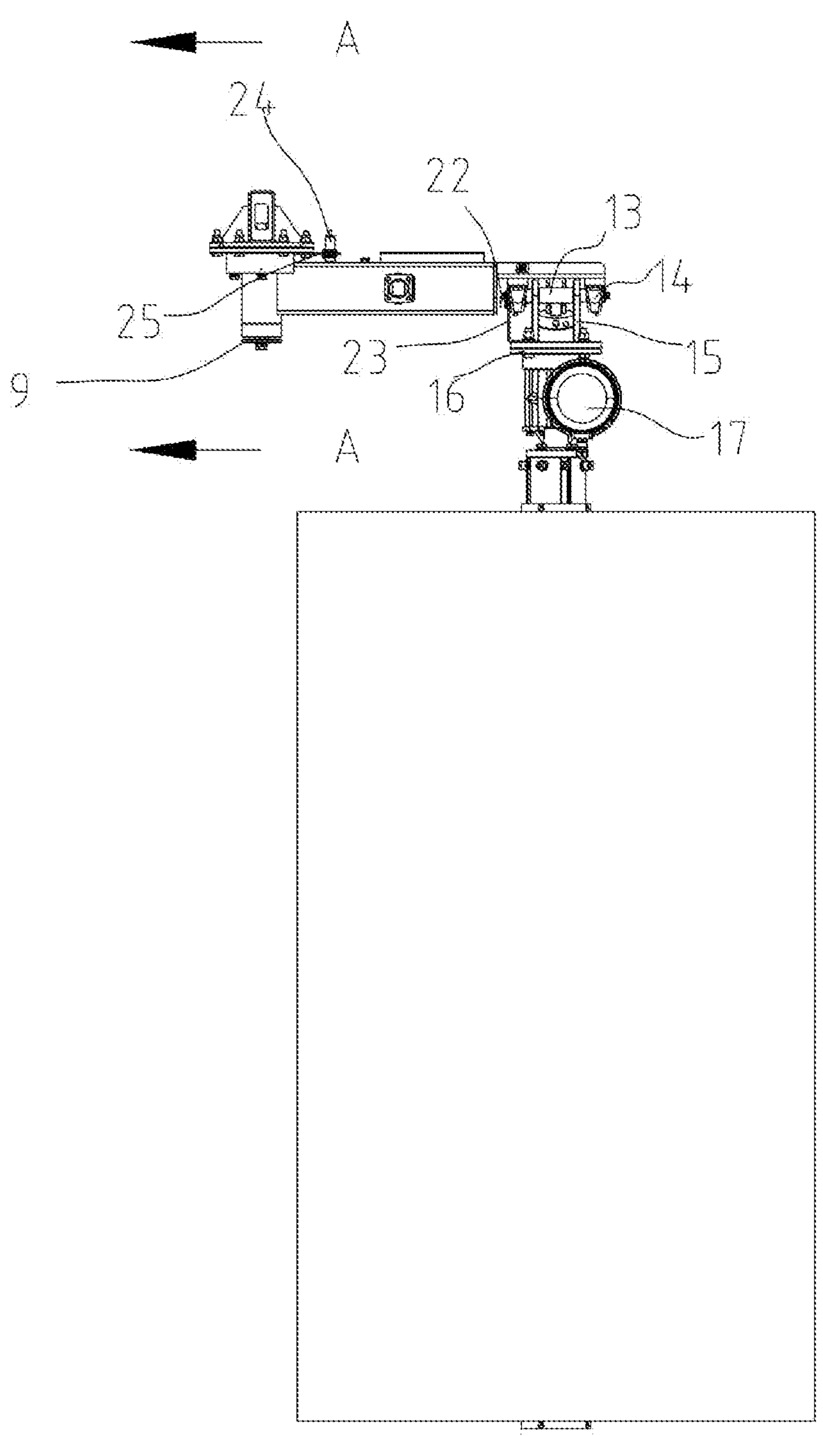
FIG. 3 is a side view of the present disclosure.
Figure 4:
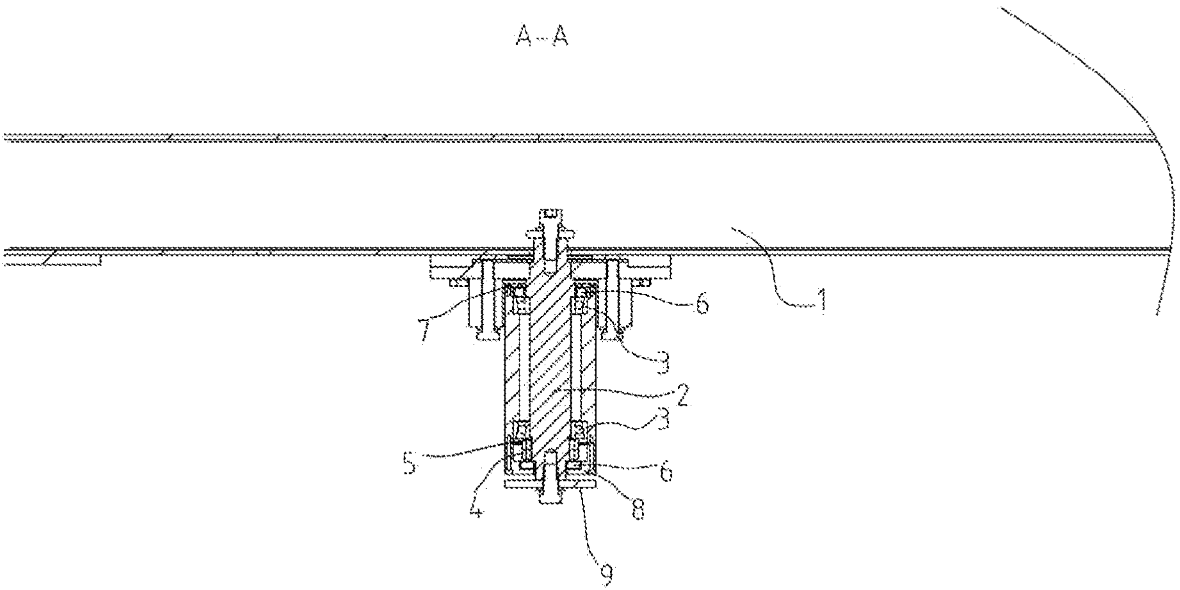
FIG. 4 is a cross-sectional view taken along line A-A in FIG. 3 of the present disclosure.

In the figures, 1. Side brush mounting beam; 2. Side brush swing shaft; 3. Rolling bearing; 4. Lock nut; 5. Lock sheet; 6. Sealing ring; 7. Sealing ring pressing plate; 8. Rocker arm end cover; 9. Anti-falling plate; 10. Limit block; 11. Side brush swing arm; 12. Rocker arm actuator cylinder; 13. Left-right skew swing shaft; 14. Vertical belt seat bearing; 15. Left-right skew bracket; 16. Reducer adapter flange; 17. Reducer; 18. Left-right skew actuator cylinder; 19. Left-right skew support; 20. Reducer output shaft; 21. Side brush assembly; 22. First proximity switch; 23. First proximity switch bracket; 24. Second proximity switch; 25. Second proximity switch bracket.

DETAILED DESCRIPTION OF THE PREFERRED EMBODIMENT

Technical solutions in embodiments of the present disclosure will be clearly and completely described below with reference to the accompanying drawings in the embodiments of the present disclosure. Apparently, the described embodiments are merely some, but not all of the embodiments of the present disclosure. All other embodiments obtained by those of ordinary skill in the art based on the embodiments in the present disclosure fall within the protection scope of the present disclosure.

Those skilled in the art should understand that, in the present disclosure, the orientations or positional relationships indicated by the terms "longitudinal", "lateral", "upper", "lower", "front", "rear", "left", "right", "vertical", "horizontal", "top", "bottom", "inner", "outer", and the like are based on the orientations or positional relationships shown in the accompanying drawings, and are intended to facilitate the description of the present disclosure and simplify the description only, rather than indicating or implying that an apparatus or element referred to must have a particular orientation or be constructed and operated in a particular orientation, and therefore, these terms cannot be interpreted as limiting the present disclosure.

As shown in FIGS. 1-4, a side brush mechanism with a novel structure includes:

- a side brush mounting beam 1, mounted on a car washing machine;
- a side brush assembly 21 for brushing left and right sides of a vehicle;
- a side brush swing arm 11 with one end rotatably connected to the side brush mounting beam 1 and the other end rotatably connected to a reducer 17;
- the reducer 17 in driving connection with the side brush assembly 21 to drive the side brush assembly 21 to rotate;
- a left-right skew actuator (left-right skew actuator cylinder 18) arranged between the side brush swing arm 11 and the reducer 17 and used for driving the reducer 17 and the side brush assembly 21 to swing vertically left and right to adjust a brushing angle; and
- a rocker arm actuator (rocker arm actuator cylinder 12) with one end rotatably connected to the side brush swing arm 11 and the other end mounted on the car washing machine to drive the side brush swing arm 11 to swing horizontally left and right.

In this embodiment, two ends of the side brush mounting beam 1 and a tail end of the rocker arm actuator cylinder 12 are mounted on a frame of the car washing machine respectively, a flange plate on a side brush swing shaft 2 is connected to a mounting plate on the side brush mounting beam 1 by bolts, rolling bearings 3 are mounted at upper and lower parts of the side brush swing shaft 2, a sealing ring 6 and a sealing ring pressing plate 7 are mounted at the upper part, and a lock sheet 5 and a lock nut 4 are mounted at the lower part; an outer ring of the rolling bearing 3 is in tight fit with the side brush swing arm 11, and a rocker arm end cover 8 is mounted on the side brush swing arm 11; and an anti-falling plate 9 is mounted on the side brush swing shaft 2;

A pair of vertical belt seat bearings 14 is mounted at the other end of the side brush swing arm 11, a left-right skew swing shaft 13 is mounted on the bearings, the left-right skew swing shaft 13 is welded together with a left-right skew bracket 15, and the left-right skew bracket 15 is connected to a reducer adapter flange 16 through bolts;

The reducer 17 is fixed on the reducer adapter flange 16 and connected to the side brush assembly 21 through a reducer output shaft 20; and A tail of the left-right skew actuator cylinder 18 is movably connected to the side brush swing arm 11, and a head of the left-right skew actuator cylinder 18 is movably connected to a left-right skew support 19; and the left-right skew support 19 is fixed on the reducer 17.

A first proximity switch bracket 23 is mounted on the left-right skew bracket 15, and a first proximity switch 22 is mounted on the first proximity switch bracket 23 and then used with a side surface of the side brush swing arm 11 to detect a skew range of the side brush assembly; and a second proximity switch bracket 25 is fixed on the side brush swing shaft 2, and a second proximity switch 24 is mounted on the second proximity switch bracket 25 and then used with an upper surface of the side brush swing arm 11 to detect a swing zero position of the side brush assembly.

Figure 5:
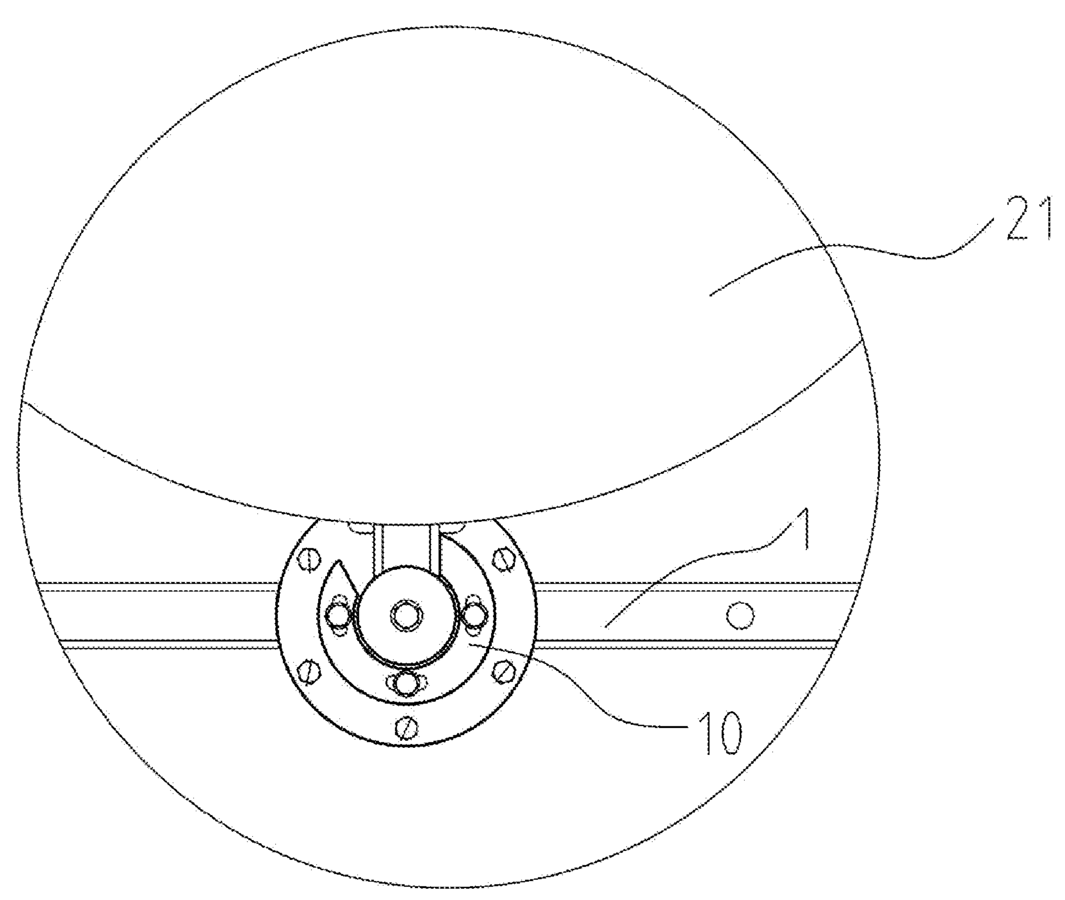
FIG. 5 is a schematic illustration of a limit block.

As shown in FIG. 5, a limit block 10 is arranged on the side brush mounting beam 1, and the limit block 10 is used for limiting an opening of a rotation stroke of the side brush swing arm 11. This can limit a swing angle of the side brush swing arm 11 and prevent the rocker arm actuator from being always at a full stroke, thereby prolonging the service life of the rocker arm actuator.

The present disclosure has the following effects:

1. Compared with a laterally moving large brush, the present disclosure employs a swing structure which is safe to use, where the swing arm swings in a forward direction of a vehicle and will not be stuck or resisted; the brush in the present disclosure is higher than a skirt brush, and the left-right skew actuator cylinder 18 is added, so that the brush can skew at a larger angle and clean a large-angle window glass position more easily;
2. The limit block 10 is mounted to control the stroke of the rocker arm actuator cylinder 12 within a normal working range, thereby avoiding mutual collision of internal structures of the cylinder; and
3. When the side brush swing arm 11 is loosened to a certain distance, the loosening can be detected by the second proximity switch 24, and the mounted anti-falling plate 9 achieves a protection role.

The unspecified parts of the present disclosure are the prior art, and therefore, are not detailed in the present disclosure.

It can be understood that the term "a" should be understood as "at least one" or "one or more", that is, in one embodiment, the number of an element may be one, and in another embodiment, the number of the element may be more than one, so the term "a" cannot be understood as a restriction on the number.

Although many professional terms are used herein, other terms are not excluded. These terms are used only for describing and explaining the essence of the present disclosure more conveniently. Interpreting the terms as any additional restrictions is contrary to the spirit of the present disclosure.

The present disclosure is not limited to the foregoing best embodiments. Any person can derive other products in various forms under the enlightenment of the present disclosure. However, regardless of any change in shape or structure, all other technical solutions that are the same as or similar to the technical solutions of the present disclosure fall within the protection scope of the present disclosure.

What is claimed is:

1. A side brush mechanism-with a novel structure, used for a tunnel type car washing machine, comprising:

a side brush mounting beam, configured to be mounted on a tunnel type car washing machine;

a side brush assembly for brushing left and right sides of a vehicle;

a side brush swing arm with one end rotatably connected to the side brush mounting beam and another end rotatably connected to a reducer;

the reducer in driving connection with the side brush assembly to drive the side brush assembly to rotate;

a left-right skew actuator arranged between the side brush swing arm and the reducer and used for driving the reducer and the side brush assembly to swing leftwards and rightwards to adjust a brushing angle; and a rocker arm actuator with one end rotatably connected to the side brush swing arm and another end configured to be mounted on the tunnel type car washing machine to drive the side brush swing arm to swing horizontally left and right;

wherein a vertical seat bearing is arranged at an end, away from the side brush mounting beam, of the side brush swing arm, the vertical seat bearing is connected to a left-right skew bracket through a left-right skew swing shaft, and the left-right skew bracket is rotatably connected to one end of the left-right skew actuator; and another end of the left-right skew actuator is rotatably connected to a left-right skew support on the reducer.

2. The side brush mechanism according to claim 1, wherein a limit block is arranged on the side brush mounting beam, and the limit block is used for limiting an opening of a rotation stroke of the side brush swing arm.

3. The side brush mechanism according to claim 1, wherein a first proximity switch bracket is arranged on the left-right skew bracket, a first proximity switch is arranged on the first proximity switch bracket, and the first proximity switch corresponds to a side surface, away from the side brush mounting beam, of the side brush swing arm and is used for detecting a skew range of the side brush assembly.

4. The side brush mechanism according to claim 1, wherein a second proximity switch bracket is arranged above the side brush swing arm, a second proximity switch is arranged on the second proximity switch bracket, and the second proximity switch is arranged on a top or bottom surface of the side brush swing arm and is used for detecting a horizontal swing zero position of the side brush assembly.

5. The side brush mechanism according to claim 1, wherein the side brush mounting beam is rotatably connected to the side brush swing arm through a side brush swing shaft, and an anti-falling plate is arranged at a bottom of the side brush swing shaft.

6. The side brush mechanism according to claim 5, wherein the side brush swing shaft is rotatably connected to the side brush swing arm through a rolling bearing, and a rocker arm end cover is arranged at a bottom of the side brush swing arm.

7. The side brush mechanism according to claim 6, wherein a sealing ring and a sealing ring pressing plate are arranged on an outward end face of the rolling bearing, and a lock sheet and a lock nut are further arranged below the rolling bearing facing the ground.

8. The side brush mechanism according to claim 3, wherein the reducer is connected to the left-right skew bracket through a reducer adapter flange.

* * * * *